INVENTORS,
HERBERT O. RAMP
HANS SCHMIDL
BY Harry M. Saragovitz
ATTORNEY

United States Patent Office 2,991,416
Patented July 4, 1961

2,991,416
FREQUENCY SHIFT MEASURING DEVICE
Herbert O. Ramp, Syracuse, N.Y., and Hans Schmidl, Wall Township, N.J., assignors to the United States of America as represented by the Secretary of the Army
Filed May 6, 1958, Ser. No. 733,453
3 Claims. (Cl. 324—79)
(Granted under Title 35, U.S. Code (1952), sec. 266)

The invention described herein may be manufactured and used by or for the Government for governmental purposes, without the payment of any royalty thereon.

The present invention relates to frequency monitoring apparatus and more particularly to an apparatus for determining the shift in frequency of an electrical signal during a prescribed time interval.

It is an object of this invention to provide an apparatus for measuring the difference between the instantaneous values of the frequency of an electrical signal at the beginning and end of a prescribed interval of time.

In brief, the present invention is directed to a frequency monitoring apparatus which includes means responsive to an electrical signal for producing a potential which is substantially a linear function of the frequency thereof. Also included is a gated peak voltage responsive detector connected to the output circuit of the signal responsive means and a pulse producing means coupled to the detector for momentarily gating the detector "on" at the beginning and end of a prescribed interval of time. In addition, there is included a differentiator responsive to the output of the detector means.

Other objects and a fuller understanding of the invention may be had by referring to the following description and claims, taken in conjunction with the accompanying drawings in which:

Figure 1:
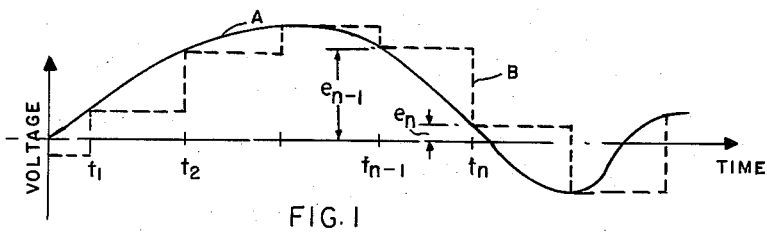
FIGURES 1 and 2 depict waveforms illustrative of the principles of the invention.

Referring more particularly to FIGURE 1, if the waveform A is detected a gated peak voltage responsive detector, i.e., a detector which is momentarily turned on, excited, or activated to detect only at predetermined instants of time, for instance, $t_1, t_2 \ldots t_{n-1}, t_n$, etc., and which stores a voltage substantially equal to the peak value detected, then the waveform B will be obtained.

Figure 2:
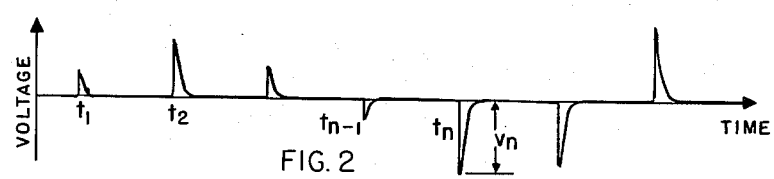

FIGURE 2 is the waveform obtained when the waveform B is passed through a differentiator. The waveform of FIGURE 2 is related to waveform A of FIGURE 1 by the equation $$v_n = e_n - e_{n-1} \tag{1}$$

where $v_n$ is the peak voltage of the pulse occurring at time $t_n$ in the waveform of FIGURE 2, and $e_{n-1}$ and $e_n$ are the instantaneous voltages attained by the waveform A at times $t_{n-1}$ and $t_n$, respectively.

Figure 3:
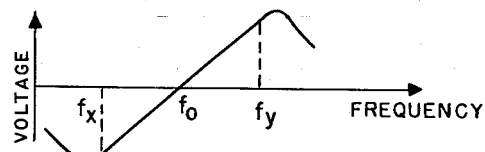
FIGURE 3 is the frequency response characteristic of a discriminator suitable for use in the invention.

FIGURE 3 illustrates the frequency response characteristic of a discriminator of the type generally used in the demodulation of frequency modulated waves. It will be seen that the characteristic is substantially linear between lower and upper frequency limits $f_x$ and $f_y$, respectively. In response to a constant amplitude signal such a discriminator will produce a potential which is approximately a linear function of the signal frequency providing, of course, that the signal frequency is always less than $f_y$ and greater than $f_x$. If waveform A of FIGURE 1 represents this potential, then $$e_{n-1} = K(f_{n-1} - f_0) \tag{2}$$

and $$e_n = K(f_n - f_0) \tag{3}$$

where K, a constant independent of frequency, is the slope of the characteristic of FIGURE 3 between the limits $f_x$ and $f_y$, $f_0$ is the discriminator resonant frequency, and $f_{n-1}$ and $f_n$ are the instantaneous values of the frequency of the discriminator input signal at times $t_{n-1}$ and $t_n$, respectively. Substitution of the expressions for $e_{n-1}$ and $e_n$ given by Equations 2 and 3 into equation 1 results in the proportionality $$f_n - f_{n-1} = \frac{1}{K} v_n \tag{4}$$

Since the quantity K may be determined by methods well known to those skilled in the art, it is apparent from Equation 4 that a measurement of the peak voltage of the pulse occurring at time $t_n$ in the waveform of FIGURE 2 will yield the shift in frequency, $f_n - f_{n-1}$, of the discriminator input signal during the period separating times $t_{n-1}$ and $t_n$, i.e., the time interval separating the instant of occurrence of said pulse and the immediately preceding instant of excitation or activation of the gated peak voltage responsive detector.

Figure 4:
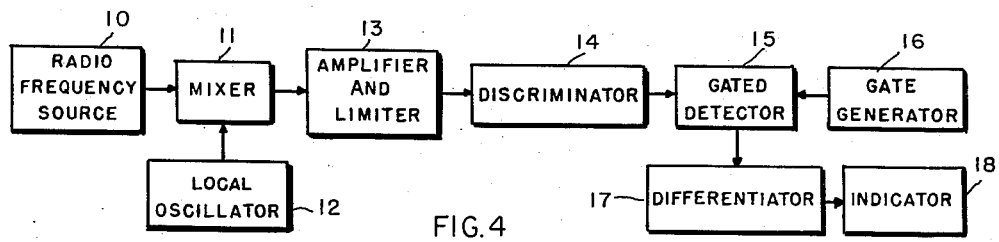
FIGURE 4 is a block diagram of an embodiment of the invention.

A block diagram of a frequency monitoring system incorporating the features of the invention is shown in FIGURE 4. This system is particularly adapted for measuring the shift in frequency of a radio frequency wave during an extremely short interval of time of the order of one millisecond. The radio frequency wave, which may be obtained from an antenna at a receiving station or other radio frequency source 10, is combined in a mixer 11 with a substantially constant frequency wave generated by a local oscillator 12. The output of mixer 11 is coupled through an amplifier and limiter circuit 13 to the input circuit of a discriminator 14 which exhibits a frequency response characteristic like that of of FIGURE 3. The output circuit of discriminator 14 is connected to a gated detector 15 which is recurrently switched or "gated on" for increments of time of the order of 30 microseconds by a train of equally spaced gating pulses supplied by a gate generator 16. A differentiator 17 is connected between the output circuit of detector 15 and a voltage indicator 18.

Mixer 11 is of the type generally used in superheterodyne receivers which produce a frequency beat signal oscillating at a beat frequency which is equal to the absolute value of the difference between the frequencies of the waves combined therein. Thus, the output signal of mixer 11 is related to the local oscillator and radio frequency waves by the expression $$f_B = |f_{RF} - f_{LO}| \tag{5}$$

where $f_B$ is the beat frequency or frequency of oscillation of the mixer output signal, and $f_{LO}$ and $f_{RF}$ are the frequencies of the local oscillator and radio frequency waves, respectively. Since the output frequency of local oscillator 12 is substantially constant, it is apparent from Equation 5 that a determination of the shift in the beat frequency over a given time interval will be a determination of the frequency shift of the radio frequency wave over the same time interval.

The local oscillator frequency is tuned to a value such that at all times the mixer output signal frequency satisfies the inequality $$f_x \leq f_B \leq f_y \tag{6}$$

where $f_x$ and $f_y$ are the lower and upper frequency limits, respectively, of the substantially linear portion of the frequency response characteristic of discriminator 14. It is, of course, assumed that the frequency excursions of the radio frequency wave are so limited that this is possible. Any fluctuations present in the amplitude of the mixer output signal are removed by the amplifier and limiter circuit 13 before it reaches the input circuit of discriminator 14. As a result discriminator 14 produces a potential, represented by waveform A in FIGURE 1, which is substantially a linear function of the beat frequency developed in mixer 11.

Gated detector 15 is of the type that samples and stores a voltage substantially equal to the peak value of the voltage input during the intervals of the applied gating pulses from generator 16. The amplitude of the detected discriminator output potential from detector 15 varies in discrete steps, as illustrated by waveform B in FIGURE 1, each step occurring at the time the detector is gated. The steps are separated by the gating pulse repetition interval, i.e., the time interval between two consecutive gating pulses. Upon the occurrence of each step, the differentiator 17 produces a pulse, as shown in FIGURE 2, which is equal in peak magnitude to the step height and positive or negative according as the step is in the positive or negative direction.

Indicator 18, which may be a memory oscilloscope or other suitable pulse measuring device, serves to measure the peak voltages of the pulses produced by differentiator 17. From Equation 4, these peak voltages yield the consecutive beat frequency shifts over the intervals separating consecutive ones of the differentiator output pulses and, hence, the consecutive frequency shifts of the radio frequency wave over the same intervals. The length of each of the intervals may be set to a desired value by adjusting the gating pulse repetition interval accordingly. Thus, if it is desired to determine the frequency shift of the radio frequency wave over one millisecond intervals, the gating pulse repetition interval must be adjusted to equal one millisecond.

Figure 5:
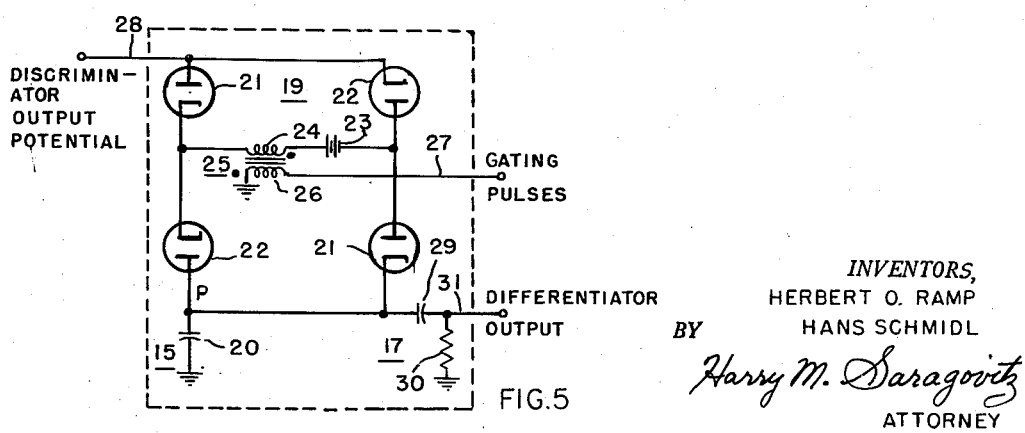
FIGURE 5 is a schematic diagram of a detecting and differentiating circuit adapted to be used in the invention.

The gated detector 15 and differentiator 17 preferably comprise a circuit arrangement of the type shown in FIGURE 5. The gated detector 15 includes the electronic switch 19 and the storage capacitor 20. The electronic switch 19 is of the bi-directional bridge type and includes diode arms 21 and 22 and a cross branch consisting of battery 23 and the secondary winding 24 of transformer 25. Transformer 25 is energized by gating pulses applied to the primary winding 26 through lead 27. The storage capacitor 20 is coupled through the electronic switch 19 to lead 28 which carries the discriminator output potential. The differentiator 17 comprises the capacitor 29 and resistor 30 connected in series relationship across the storage capacitor 20. The differentiator output is measured between lead 31 and ground.

In the absence of a gating pulse on lead 27 the diode arms 21 and 22 are biased beyond cut-off by the voltage developed by battery 23 whereby storage capacitor 20 is normally isolated from lead 28. The polarity of the gating pulses is such that when one is applied to lead 27, a voltage is induced in the secondary winding 24 of the transformer 25 which is opposite in polarity to the battery voltage and of sufficient magnitude to overcome the cut-off bias. Thus, upon the occurrence of a gating pulse the diode arms 21 or 22 conduct for the duration of the pulse according as the voltage then present on lead 28 is positive or negative, respectively, with reference to ground. This creates a low impedance charge path comprising secondary winding 24, battery 23, and diode arms 21 or 22 between storage capacitor 20 and lead 28 for the discriminator output potential. The time constant of the series combination comprising capacitor 20 and the low impedance charge path is such that capacitor 20 will almost completely charge to the instantaneous value of the potential on lead 28 during the lifetime of the gating pulse, which, for instance, may be of the order of 30 microseconds.

Due to the resistance value of resistor 30 and the amount of capacitance required in capacitor 29 to give clear differentiation, the capacitor 29 charges through the electronic switch 19 during the intervals of the applied gating pulses at a much slower rate than does the storage capacitor 20. Since, capacitor 20 is not isolated from resistor 30 and capacitor 29, it will discharge through resistor 30 into capacitor 29 in the gating pulse repetition interval. In order to limit this discharge to a minimum and thus prevent appreciable decay of the voltage at point P during the pulse repetition interval, the capacitance of capacitor 29 is chosen to be relatively less than that of capacitor 20. As a result, after the occurrence of a gating pulse on lead 27, capacitor 29 charges to a voltage substantially equal to the instantaneous value of the potential on lead 28 at the time of application of the pulse. Consequently, upon the occurrence of the next gating pulse on lead 27, a pulse will appear on lead 31 which has a peak voltage substantially equal to the difference between the instantaneous value of the potential then present on lead 28 and the instantaneous value of the potential existing on lead 28 during the period of application of the immediately preceding gating pulse.

While the invention has been described with reference to what is at present considered a preferred embodiment thereof, it is to be understood that various changes and modifications obvious to those skilled in the art may be made in the apparatus shown without departing from the spirit and scope of the invention.

What is claim is:

1. An apparatus for determining the shift in frequency of an electrical signal during a prescribed interval of time comprising, in combination, means responsive to said signal for producing a potential which is substantially a linear function of the frequency of said signal, an electronic switch and a storage capacitor connected in series relationship across the output circuit of said signal responsive means, pulse producing means coupled to said electronic switch for momentarily activating said switch only at predetermined instants of time to provide a low impedance charge path between said storage capacitor and the output circuit of said signal responsive means, and a differentiator, said storage capacitor being connected directly across the input circuit of said differentiator wherein the frequency at which said switch is activated is considerably greater than the frequency at which said potential varies and where said differentiator produces a pulse at each of said predetermined instants of time which is substantially proportional in peak magnitude to the shift in frequency of said electrical signal during the time interval separating the instant of occurrence of said pulse and the immediately preceding instant of activation of said electronic switch, and means for indicating the peak magnitude of said pulse.

2. The apparatus defined in claim 1 wherein said differentiator comprises a capacitor and a resistor connected in series relationship across said storage capacitor.

3. In an apparatus for monitoring the frequency of a first electrical signal having means for producing a second signal oscillating at a substantially constant frequency and means including a mixer for combining said first and second signals to produce a third signal oscillating at a frequency equal to the difference of said first and second signals, means responsive to said third signal for producing a potential which is substantially a linear function of the frequency of said third signal, electronic gate means connected to the output circuit of said signal responsive means, a storage capacitor connected to the output of said electronic gate means, pulse producing means coupled to said gate means for recurrently activating said gate means to detect said potential only at predetermined instants of time and thereby develop a voltage across said capacitor having a steplike waveform, differentiator means connected directly across said capacitor responsive to said step voltage for producing a pulse at each of said predetermined instants of time which is substantially equal in peak magnitude to the shift in frequency of said first signal during the time interval separating the instant of occurrence of said pulse and the immediately preceding instant of activation of said detector means, wherein the frequency at which said electronic gate means is activated is considerably higher than the frequency at which said potential varies, and means for indicating the peak magnitude of said pulse.

References Cited in the file of this patent

UNITED STATES PATENTS

| | | |
|---|---|---|
| Re. 24,407 | Christensen | Dec. 17, 1957 |
| 2,324,077 | Goodale et al. | July 13, 1943 |
| 2,752,593 | Downs | June 26, 1956 |
| 2,799,855 | Gale | July 16, 1957 |
| 2,817,757 | Durbin | Dec. 24, 1957 |
| 2,829,251 | Patton | Apr. 1, 1958 |
| 2,840,814 | Hemphill | June 24, 1958 |
| 2,866,090 | Sherr | Dec. 23, 1958 |
| 2,877,344 | Dodington | Mar. 10, 1959 |
| 2,881,255 | Hall | Apr. 7, 1959 |
| 2,889,516 | Staschover | June 2, 1959 |
| 2,896,074 | Newsom et al. | July 21, 1959 |
| 2,935,686 | Kerns et al. | May 3, 1960 |

OTHER REFERENCES

Waveforms, textbook by Chance et al., Radiation Laboratories Series, volume 19, published by McGraw-Hill, copyright 1949, pages 513–524.